United States Patent
Nogami

(10) Patent No.: US 11,318,627 B2
(45) Date of Patent: May 3, 2022

(54) SENSOR UNIT, CONTROL METHOD, AND RECORDING MEDIUM

(71) Applicant: OMRON Corporation, Kyoto (JP)

(72) Inventor: Hidekatsu Nogami, Kusatsu (JP)

(73) Assignee: OMRON Corporation, Kyoto (JP)

( * ) Notice: Subject to any disclaimer, the term of this patent is extended or adjusted under 35 U.S.C. 154(b) by 769 days.

(21) Appl. No.: 16/190,153

(22) Filed: Nov. 14, 2018

(65) Prior Publication Data

US 2019/0248028 A1    Aug. 15, 2019

(30) Foreign Application Priority Data

Feb. 14, 2018    (JP) .............................. JP2018-024358

(51) Int. Cl.
| | | |
|---|---|---|
| *B25J 19/02* | (2006.01) | |
| *G01P 15/08* | (2006.01) | |
| *G06F 11/30* | (2006.01) | |
| *G05B 23/02* | (2006.01) | |
| *B25J 9/16* | (2006.01) | |

(52) U.S. Cl.
CPC .............. *B25J 19/02* (2013.01); *B25J 9/1674* (2013.01); *G01P 15/08* (2013.01); *G05B 23/0235* (2013.01); *G05B 23/0281* (2013.01); *G06F 11/3058* (2013.01); *G05B 2219/37001* (2013.01); *G05B 2219/37388* (2013.01); *G05B 2219/39412* (2013.01)

(58) Field of Classification Search
CPC ......... B25J 9/1674; B25J 19/02; G01P 15/08; G05B 23/0235; G05B 23/0281; G06F 11/3058

USPC .......................................................... 700/245
See application file for complete search history.

(56) References Cited

U.S. PATENT DOCUMENTS

| | | | |
|---|---|---|---|
| 5,778,549 A | 7/1998 | Campanile | |
| 8,571,776 B2* | 10/2013 | Braunberger | ......... B60W 30/18 |
| | | | 701/1 |
| 9,132,549 B2 | 9/2015 | Kaiser | |
| 2005/0264251 A1 | 12/2005 | Bischoff et al. | |
| 2006/0065050 A1* | 3/2006 | Saito | ...................... G01C 21/10 |
| | | | 73/511 |
| 2008/0033695 A1* | 2/2008 | Sahara | ................... G01H 1/003 |
| | | | 702/185 |

(Continued)

FOREIGN PATENT DOCUMENTS

| | | |
|---|---|---|
| CN | 1918475 | 2/2007 |
| CN | 103529867 | 1/2014 |
| CN | 104160617 | 11/2014 |

(Continued)

OTHER PUBLICATIONS

"Search Report of Europe Counterpart Application", dated May 23, 2019, p. 1-p. 7.

(Continued)

*Primary Examiner* — Aditya S Bhat
(74) *Attorney, Agent, or Firm* — JCIPRNET

(57) ABSTRACT

A sensor unit, a control method, and a recording medium are provided for reducing data amount of failure diagnosis data while detecting a failure of a device performing work while moving more reliably. The disclosure includes an output limiting part outputting the failure diagnosis data only for a period in which an absolute value of the acceleration is equal to or less than a predetermined threshold.

11 Claims, 3 Drawing Sheets

(56) References Cited

U.S. PATENT DOCUMENTS

2009/0164142 A1* 6/2009 Studer .................. G01H 1/003
702/33
2016/0167699 A1* 6/2016 Yamaguchi ....... B60W 50/0205
701/41

FOREIGN PATENT DOCUMENTS

| CN | 104670145 | 6/2015 |
| CN | 106742067 | 5/2017 |
| CN | 107614217 | 1/2018 |
| DE | 102008054312 | 5/2010 |
| EP | 3238887 | 11/2017 |
| GB | 2009455 | 6/1979 |
| JP | H07210221 | 8/1995 |
| JP | 2006300895 | 11/2006 |
| JP | 2012168926 | 9/2012 |
| JP | 2017016187 | 1/2017 |
| TW | 201201525 | 1/2012 |
| WO | 2013129294 | 9/2013 |

OTHER PUBLICATIONS

"Office Action of Japan Counterpart Application" with English translation thereof, dated Jun. 29, 2021, p. 1-p. 4.
Office Action of Japan Counterpart Application, with English translation thereof, dated Mar. 2, 2021, pp. 1-3.
"Office Action of China Counterpart Application" with English translation thereof, dated Oct. 28, 2021, p. 1-p. 19.

* cited by examiner

SENSOR UNIT, CONTROL METHOD, AND RECORDING MEDIUM

CROSS-REFERENCE TO RELATED APPLICATION

This application claims the priority benefit of Japan application serial no. 2018-024358, filed on Feb. 14, 2018. The entirety of the above-mentioned patent application is hereby incorporated by reference herein and made a part of this specification.

BACKGROUND

Technical Field

The disclosure relates to a sensor unit, a control method, and a recording medium.

Description of Related Art

Conventionally, the technique of generating failure diagnosis data from acquired data from a sensor mounted on a robot (a device performing work while moving) and detecting a failure of the robot by using this failure diagnosis data is known. In this technique, the data amount of the failure diagnosis data is required to be reduced. This is because if the data amount of the failure diagnosis data is too large, it is difficult to transmit the failure diagnosis data by a wireless communication method.

As an example of the technique for reducing the data amount of the failure diagnosis data, a technique in which the sampling frequency for sampling the acquired data from the sensor is lowered when the value of the acquired data from the sensor is equal to or less than a predetermined threshold (see Patent Document 1: Japanese Laid-Open No. 2017-016187 published on Jan. 19, 2017) is provided.

However, there are cases in which the defect due to a failure of the robot appears more prominently when the absolute value of the acquired data from the sensor is almost 0 than the time when the absolute value of the acquired data is large.

An example of the above cases includes the case where an acceleration sensor measuring acceleration related to movement of the robot is used as the sensor. That is, the defect can appear prominently when the robot is moving at a high speed. In addition, when the robot is moving at a constant speed, the absolute value of the acquired data from the acceleration sensor is almost zero. In other words, in the case where the acceleration sensor is used as the sensor, when the robot is moving at a constant high speed, the defect can appear prominently even though the absolute value is almost 0. As an example of this defect, the robot may vibrate greatly when moving owing that the bearings provided on the joints of the robot are damaged.

In the case where the technique of lowering the sampling frequency for sampling the acquired data from the acceleration sensor when the absolute value of the acquired data from the acceleration sensor is equal to or less than the predetermined threshold is applied, the following issue occurs. That is, in this case, when the defect appears prominently, the sampling frequency may be lowered since the absolute value of the acquired data from the acceleration sensor is small. As a result, despite that this defect appears prominently, the failure of the robot may not be detected due to the failure in detecting this defect.

SUMMARY

An embodiment of the disclosure provides a sensor unit that outputs failure diagnosis data for detecting a failure of a device performing work while moving. The sensor unit includes: an acceleration sensor measuring acceleration related to the moving; a period specifying part specifying a period in which an absolute value of the acceleration is equal to or less than a predetermined threshold; and an output limiting part outputting the failure diagnosis data only in the period.

An embodiment of the disclosure provides a control method of a sensor unit including an acceleration sensor that measures acceleration related to moving of a device performing a task while moving, and outputting failure diagnosis data for detecting a failure of the device. The control method includes: specifying a period in which an absolute value of the acceleration is equal to or less than a predetermined threshold; and outputting the failure diagnosis data only in the period.

The control method according to an embodiment of the disclosure may also be executed by a computer. In this case, the scope of the disclosure also includes a program for causing a computer to execute the control method and a non-transitory computer-readable recording medium that stores the program.

DESCRIPTION OF THE EMBODIMENTS

Figure 1:
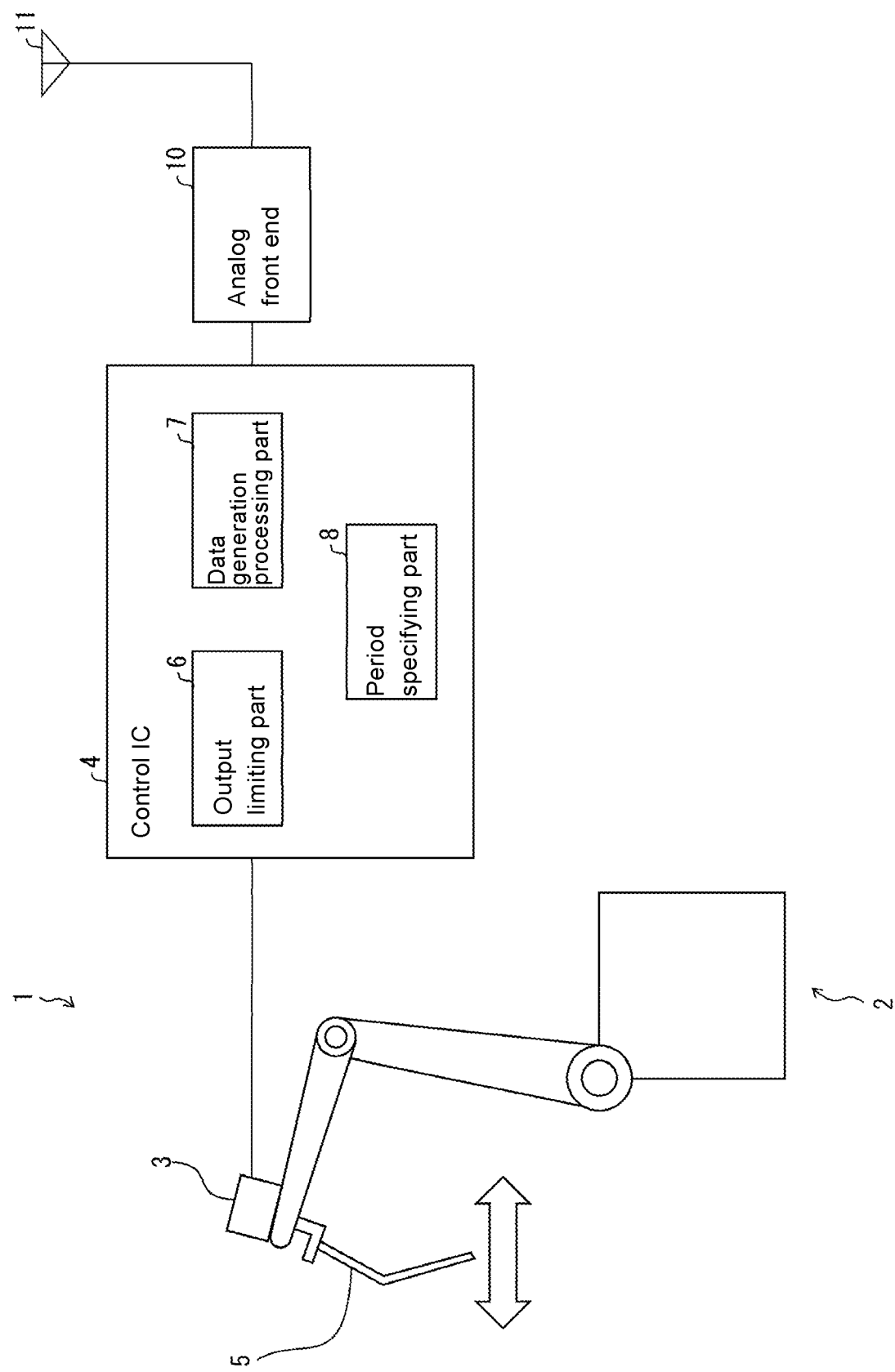
FIG. 1 is a diagram showing a schematic configuration of a sensor unit according to an embodiment of one aspect of the disclosure.

An embodiment of the disclosure provides a sensor unit, a control method, a program, and a recording medium which make it possible to more reliably detect the failure of the device performing work while moving, while reducing the data amount of the failure diagnosis data.

The absolute value of the acceleration being equal to or less than the predetermined threshold means that the movement of the device is at a constant speed or a nearly constant speed. In the case where the movement of the device is at a constant speed, there is a possibility that the movement of the device is at a high speed because the device has finished accelerating. Similarly, in the case where the movement of the device is at a nearly constant speed, there is a possibility that the movement of the device is at a high speed because the device is about to finish accelerating. On the other hand, the absolute value exceeding the predetermined threshold means that the device is in the middle of acceleration. In other words, there is a high possibility that the movement of the device is at a low speed. When the movement of the device is at a high speed, the defect tends to appear prominently as compared with the case where the movement of the device is at a low speed. According to the above configuration, the failure diagnosis data is output only in the period in which the defect tends to appear prominently. Therefore, it is possible to more reliably detect the failure of the device while reducing the data amount of the failure diagnosis data.

In the sensor unit according to an embodiment of the disclosure, the period specifying part may also specify the period according to a measurement result by the acceleration sensor. In the sensor unit according to an embodiment of the disclosure, the period specifying part may also specify the period according to a predetermined schedule of the moving.

According to each of the configurations described above, it is possible to specify the period.

The sensor unit according to an embodiment of the disclosure includes a data generation processing part generating the failure diagnosis data obtained through reducing a data amount of acquired data from the acceleration sensor.

According to the above configuration, the data amount of the failure diagnosis data can be further reduced.

In the sensor unit according to an embodiment of the disclosure, the output limiting part stops the data generation processing part from generating the failure diagnosis data at a time of not outputting the failure diagnosis data.

According to the above configuration, it is possible to reduce power consumption due to generation of the failure diagnosis data.

According to an embodiment of the disclosure, it is possible to more reliably detect the failure of a device performing work while moving, while reducing the data amount of the failure diagnosis data.

Hereinafter, embodiments according to one aspect of the disclosure (hereinafter also referred to as "this embodiment") will be described with reference to the drawings. However, in all respects, this embodiment described below is merely an example of the disclosure. It goes without saying that various improvements or modifications can be made without departing from the scope of the disclosure. In other words, a specific configuration according to the embodiment may be appropriately adopted when implementing the disclosure.

§ 1 Application Example

Figure 2:
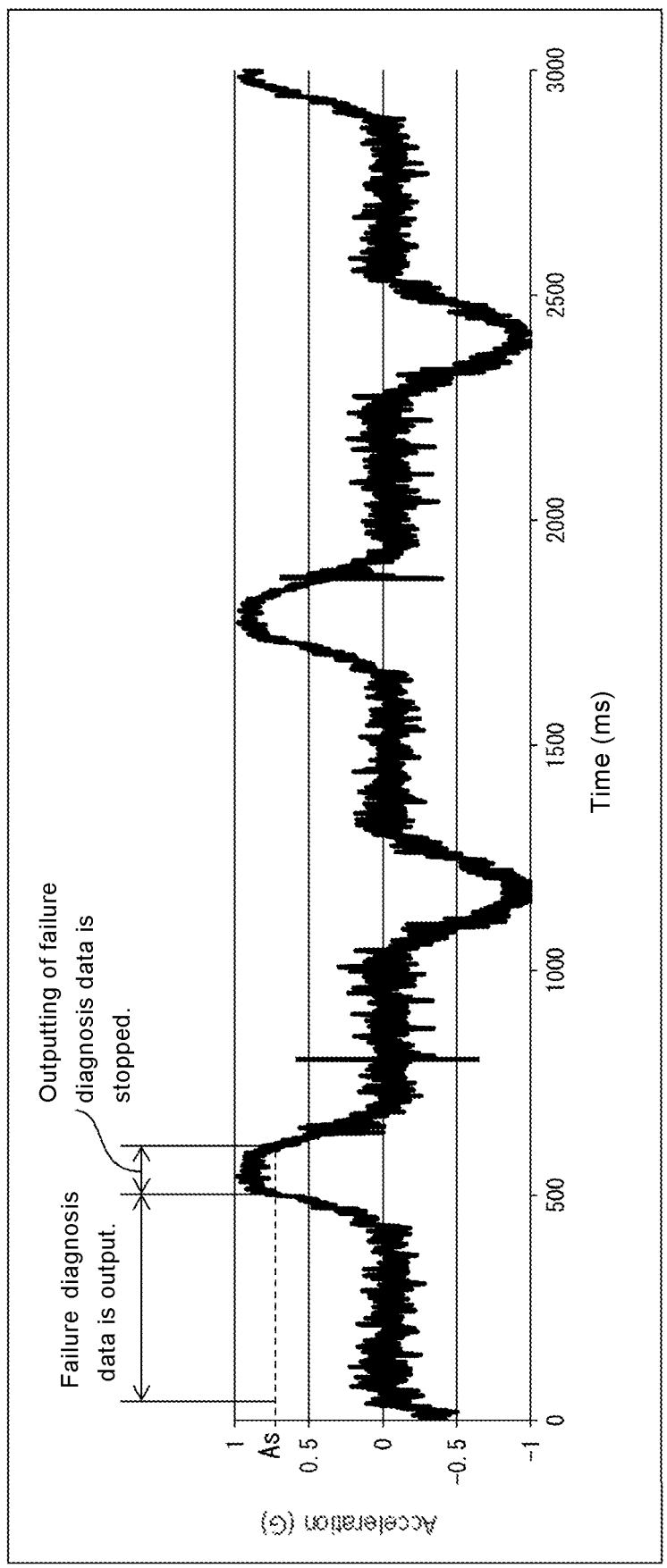
FIG. 2 is a graph showing an example of acquired data from an acceleration sensor.

Firstly, with reference to FIGS. 1 and 2, an example of a situation for which the disclosure is suitable is described.

FIG. 1 is a diagram showing a schematic configuration of a sensor unit 1 according to this embodiment. The sensor unit 1 outputs failure diagnosis data for detecting a failure of a robot 2 (a device performing work while moving). The sensor unit 1 includes an acceleration sensor 3, a control integrated circuit (IC) 4, and an analog front end 10.

FIG. 2 is a graph showing an example of acquired data from the acceleration sensor 3. In the graph shown in FIG. 2, the horizontal axis represents time (unit: ms) and the vertical axis represents acceleration (unit: G).

The acceleration sensor 3 is mounted on the robot 2 and measures the acceleration related to moving of the robot 2 by sampling based on a predetermined sampling frequency (hereinafter referred to as "measurement sampling frequency"). An arm 5 of the robot 2 may serve as an example of the portion actually moving in the robot 2. The measurement result of the acceleration related to the moving of the robot 2 is equivalent to the acquired data from the acceleration sensor 3 to be described later. The acquired data from the acceleration sensor 3 includes not only the acceleration related to the main movement of the robot 2 but also vibrations depending on the surrounding environment and vibrations due to the driving mechanism of the robot 2.

The control IC 4 has an output limiting part 6, a data generation processing part 7, and a period specifying part 8. The period specifying part 8 specifies a period in which the absolute value of the acceleration measured by the acceleration sensor 3 is equal to or less than a predetermined threshold As. The output limiting part 6 outputs failure diagnosis data from the sensor unit 1 only in the period in which the absolute value of the acceleration is equal to or less than the predetermined period As. Meanwhile, the output limiting part 6 stops outputting of the failure diagnosis data from the sensor unit 1 outside the period.

The absolute value of the acceleration being equal to or less than the predetermined threshold As means that the movement of the robot 2 is at a constant speed or a nearly constant speed. In the case where the movement of the robot 2 is at a constant speed, there is a possibility that the movement of the robot 2 is at a high speed as the robot 2 has finished accelerating. Similarly, in the case where the movement of the robot 2 is at a nearly constant speed, there is a possibility that the movement of the robot 2 is at a high speed because the robot 2 is about to finish accelerating. On the other hand, the absolute value exceeding the threshold As means that the robot 2 is in the middle of acceleration. In other words, there is a high possibility that the movement of the robot 2 is at a low speed. When the movement of the robot 2 is at a high speed, the defect due to the failure of the robot 2 tends to appear prominently as compared with the case where the movement of the robot 2 is at a low speed. According to the sensor unit 1, the failure diagnosis data is output only in the period in which the defect tends to appear prominently. Therefore, it is possible to more reliably detect the failure of the robot 2 while reducing the data amount of the failure diagnosis data output from the sensor unit 1.

The data generation processing part 7 generates the failure diagnosis data.

The failure diagnosis data generated by the sensor unit 1 is transmitted from an antenna 11 to another electronic device (not shown) via the analog front end 10. For example, the electronic device may be a radio frequency identification (RFID) reader, a controller of the robot 2, and a controller that comprehensively controls a network system including the robot 2. When the electronic device is an RFID reader, the sensor unit 1 may be an RFID tag. In the sensor unit 1, while it is assumed that a wireless communication method serves as the method of transmitting the failure diagnosis data to the electronic device, a wired communication method may also be used. Although the antenna 11 is a component of the configuration of the sensor unit 1, the antenna 11 is not a necessary configuration.

§ 2 Configuration Example

In the sensor unit 1, the period specifying part 8 is provided in the control IC 4, and specifies the period by determining whether the absolute value of the acceleration is equal to or less than the predetermined threshold As based on the measurement result by the acceleration sensor 3. However, the period specifying part 8 may also specify the period according to a predetermined schedule of the moving of the robot 2. In this case, the period specifying part 8 is provided in any one of the aforementioned various controllers, for example, and specifies the period in which the absolute value of the acceleration is equal to or less than the predetermined threshold As according to the schedule determined by the corresponding controller. In these ways, the period can be specified.

The data generation processing part 7 generates the failure diagnosis data, for example, according to the following. First, the data generation processing part 7 performs a frequency analysis on the acquired data from the acceleration sensor 3. Subsequently, the data generation processing part 7 detects the maximum frequency from the result of the frequency analysis. The maximum frequency is defined as the highest frequency among at least one type of frequency having a power not lower than a predetermined threshold. Subsequently, the data generation processing part 7 sets a frequency twice or more of the maximum frequency as a sampling frequency, samples the acquired data from the acceleration sensor 3, and generates the failure diagnosis data. It should be noted that the sampling frequency set by the data generation processing part 7 needs to be equal to or less than the measurement sampling frequency. Also, in the frequency analysis, a high-accuracy analysis may be performed by adopting Fourier transform such as Fast Fourier transform (FFT), or a simple analysis may be performed by passing through at least one high-pass filter.

In this way, the sensor unit 1 includes the data generation processing part 7 generating the failure diagnosis data obtained through reducing the data amount of the acquired data from the acceleration sensor 3. In this way, the data amount of the failure diagnosis data can be reduced.

When the failure diagnosis data is not output from the sensor unit 1, the output limiting part 6 may also stop the data generation processing part 7 from generating the failure diagnosis data by. For example, the output limiting part 6 may stop the data generation processing part 7 from generating the failure diagnosis data by interrupting the frequency analysis. As a result, it is possible to reduce power consumption due to generation of the failure diagnosis data.

Figure 3:
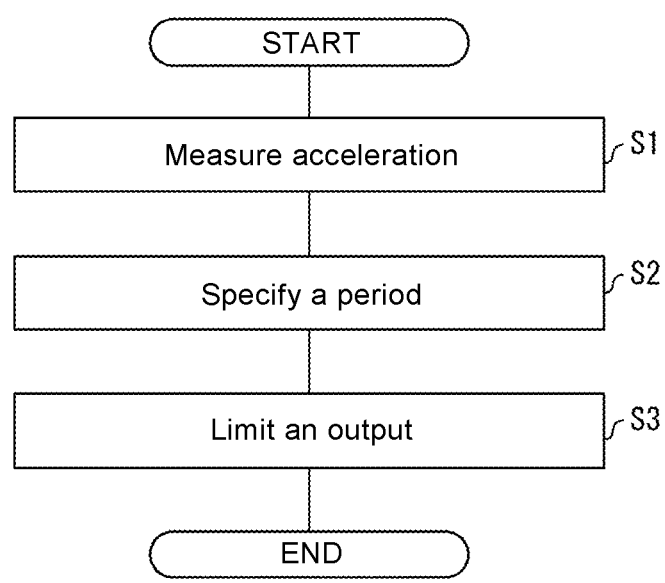
FIG. 3 is a flowchart showing a flow of operations in the sensor unit shown in FIG. 1.

FIG. 3 is a flowchart showing a flow of operations in the sensor unit 1.

First, the acceleration sensor 3 measures the acceleration related to the moving of the robot 2 (Step S1).

Subsequently, the period specifying part 8 specifies the period in which the absolute value of the acceleration measured by the acceleration sensor 3 is equal to or less than the predetermined threshold As (Step S2).

Subsequently, the output limiting part 6 outputs the failure diagnosis data from the sensor unit 1 only in the period. On the other hand, outside the period, the output limiting part 6 stops outputting of the failure diagnosis data from the sensor unit 1 (Step S3). In addition, in Step 3, in the case of stopping outputting of the failure diagnosis data from the sensor unit 1, the output limiting part 6 may also stop the data generation processing part 7 from generating the failure diagnosis data by interrupting the frequency analysis, for example, as described above.

Other than the robot 2, a processing machine for operation in a factory, an automatic guided vehicle (AGV), etc., for example, can serve as the device that performs work while moving.

The output limiting part 6, the data generation processing part 7, and the period specifying part 8 of the sensor unit 1 may be realized by a logic circuit (hardware) formed on an integrated circuit (IC chip) or the like. On the other hand, the output limiting part 6, the data generation processing part 7, and the period specifying part 8 of the sensor unit 1 may also be realized by software.

In the latter case, the sensor unit 1 includes a computer that executes instructions of a program that is software that realizes the respective function. The computer includes, for example, one or more processors, and has a recording medium that is computer-readable and stores the program. In the computer, the processor reads the program from the recording medium and executes the program. As the processor, a central processing unit (CPU), for example, can be used. As the recording medium, a tape, a disk, a card, a semiconductor memory, a programmable logic circuit, and the like can be used, other than a "non-transitory tangible medium" such as a read only memory (ROM). Further, a random access memory (RAM), etc., for developing the program may be further included. Moreover, the program may be supplied to the computer via an arbitrary transmission medium (a communication network, a broadcast wave or the like) capable of transmitting the program. In addition, an aspect of the disclosure may also be realized in a form of a data signal embedded in a carrier wave in which the program is embodied through electronic transmission.

The disclosure is not limited to the embodiments described above, various modifications are possible within the scope indicated in the claims, and embodiments obtained by appropriately combining technical means respectively disclosed in different embodiments are also included in the technical scope of the disclosure.

What is claimed is:

1. A sensor unit, outputting failure diagnosis data for detecting a failure of a device performing work while moving, the sensor unit comprising:
    an acceleration sensor measuring acceleration related to the moving;
    a period specifying part specifying a period in which an absolute value of the acceleration is equal to or less than a predetermined threshold; and
    an output limiting part outputting the failure diagnosis data only in the period.

2. The sensor unit according to claim 1, wherein the period specifying part specifies the period according to a measurement result by the acceleration sensor.

3. The sensor unit according to claim 2, comprising:
    a data generation processing part generating the failure diagnosis data obtained through reducing a data amount of acquired data from the acceleration sensor.

4. The sensor unit according to claim 3, wherein the output limiting part stops the data generation processing part from generating the failure diagnosis data at a time of not outputting the failure diagnosis data.

5. The sensor unit according to claim 1, wherein the period specifying part specifies the period according to a predetermined schedule of the moving.

6. The sensor unit according to claim 5, comprising:
    a data generation processing part generating the failure diagnosis data obtained through reducing a data amount of acquired data from the acceleration sensor.

7. The sensor unit according to claim 4, wherein the output limiting part stops the data generation processing part from generating the failure diagnosis data at a time of not outputting the failure diagnosis data.

8. The sensor unit according to claim 1, comprising:
    a data generation processing part generating the failure diagnosis data obtained through reducing a data amount of acquired data from the acceleration sensor.

9. The sensor unit according to claim 8, wherein the output limiting part stops the data generation processing part from generating the failure diagnosis data at a time of not outputting the failure diagnosis data.

10. A control method of a sensor unit comprising an acceleration sensor that measures acceleration related to moving of a device performing a task while moving, and outputting failure diagnosis data for detecting a failure of the device, the control method comprising:
    specifying a period in which an absolute value of the acceleration is less than or equal to a predetermined threshold; and
    outputting the failure diagnosis data only in the period.

11. A non-transitory computer-readable recording medium that records a program causing a computer to execute the control method according to claim 10.

\* \* \* \* \*